Sept. 26, 1933.          J. G. GILLESPIE                1,928,532
METHOD OF AND APPARATUS FOR APPLYING POWER FOR
    THE OPERATION OF RECIPROCATORY PUMPS
              Filed Aug. 19, 1932
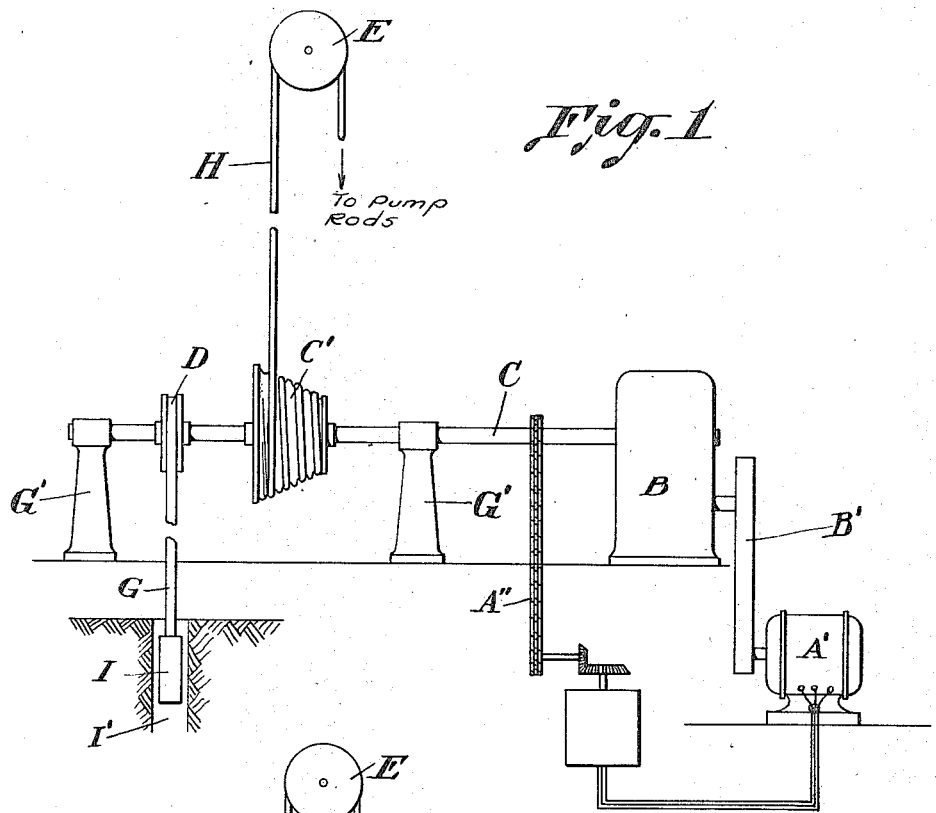
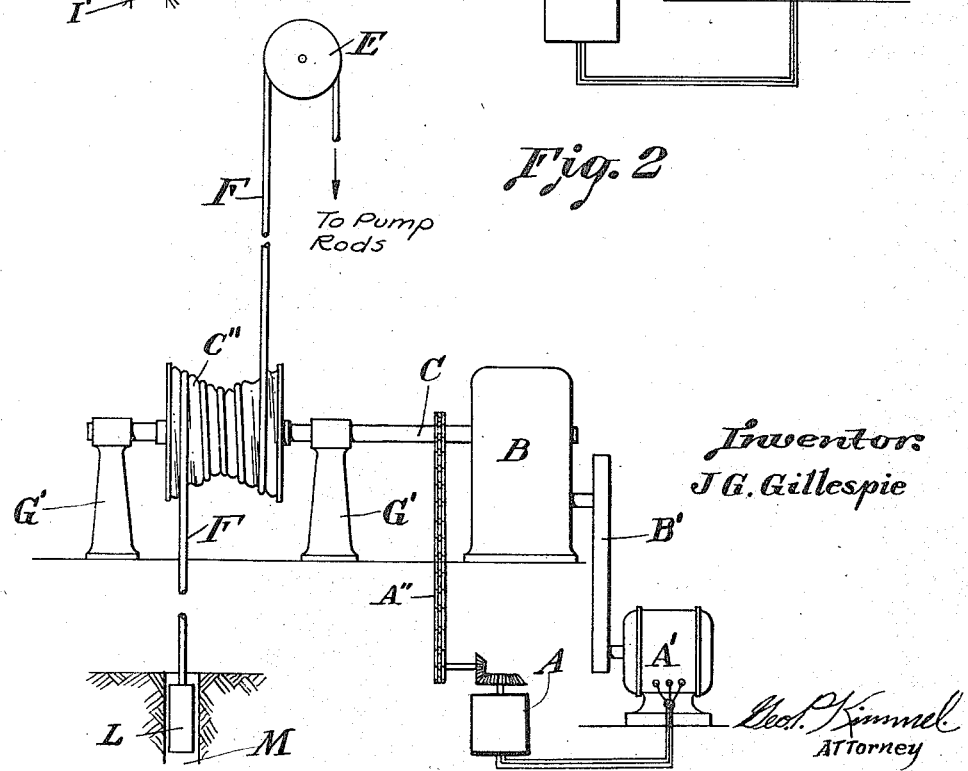
Inventor:
J. G. Gillespie
Geo. F. Kimmel
   Attorney Patented Sept. 26, 1933

1,928,532

UNITED STATES PATENT OFFICE 1,928,532

METHOD OF AND APPARATUS FOR APPLYING POWER FOR THE OPERATION OF RECIPROCATORY PUMPS

J Gayle Gillespie, Tyler, Tex.

Application August 19, 1932. Serial No. 629,558

9 Claims. (Cl. 254—178)

This invention relates to a new and useful method of applying power for the operation of reciprocatory pumps used for lifting fluid from beneath the earth's surface, and the invention has for its object to provide, in a manner as hereinafter set forth, a power-applying method resulting in a long pumping stroke.

A further object of the invention is to provide, in a manner as hereinafter set forth, a power applying method whereby a long pump stroke is obtained by employing a constantly changing counter-weight effect to provide an unbalancing action during the completion of one stroke and made available at the end of such stroke to start or assisting in starting the succeeding stroke.

As illustrating, by way of example, of two forms of an apparatus capable of carrying out the method in accordance with this invention, reference is had to the accompanying drawing in which Figure 1 is a diagrammatical view illustrating one of the forms and Figure 2 is a like view illustrating the other form.

With reference to Figure 1, A indicates a reversing controller for a prime mover A', the latter being in the form of an electric motor. A speed reducing mechanism is designated B and it is operated by a drive connection B' from motor A'. An operating shaft C is driven from reducer B and which has secured thereto a drum or reel D on which and from which winds on and off respectively a flexible counter-weighted flat member which may be in the form of a flat cable or chain and is illustrated by way of example as a flat cable G provided with a counter-weight I operating in a well L'. Supports G' are provided for the shaft C. The controller A is controlled by gear chain A'' which is operated from shaft C.

Fixed to shaft C is a conical grooved drum C' on which winds and from which winds on and off respectively a flexible member which may be a cable or chain and is shown by way of example as a cable H which travels over a grooved pulley E arranged above drum C'. The cable H is attached to a pump rod not shown.

The form shown in Figure 2 is the same as that shown in Figure 1, with this exception, that an oppositely coned groove drum C'' upon which a pair of cables F wind on and off alternately in opposite directions with respect to each other are employed in lieu of the drum C', the two cables H and G and the drum or reel D. The cables F extend in opposite directions and one has its upper stretch travelling over pulley E and the other has its lower stretch carrying a counter-weight L operating in a well M. That cable F which travels over pulley E is attached to a pump rod. Otherwise than that as stated the form shown in Figure 2 is the same as that shown in Figure 1.

The unbalancing is secured during the completion of each stroke by the change in effective radii of the element (reels, conical drums, etc.), and is available at the end of each stroke to start or help start the succeeding stroke from the prime mover while it is in process of acceleration.

*Operation.*—When the pump is at the end of its down stroke its cable is working through a short radius on its cable reel C', conical grooved drum or the oppositely coned grooved drum C'' while the counter-weight is working through a long radius on its cable reel D, conical grooved drum or the oppositely coned grooved drum C''.

The upward stroke of the pump is therefore started by the counter-weight I without effort from the prime mover. The prime mover is put in operation by the controller after the up-stroke is started and finishes the stroke while in normal operation. When the pump reaches the end of its up-stroke the controller de-energizes the prime mover. The pump cable is now working through a long radius while the counter-weight is working through a short radius. This enables the weight of the pump rods to start the down-stroke without effort from the prime mover. Prime mover is put in operation by controller after the stroke is started and finishes the down-stroke at which point it is de-energized by controller, thus completing the cycle.

The change in radius can be goverened by the size of the cable reels and the thickness of the flat cable winding thereon, and by the steepness of the conical grooved drum.

Two arrangements of the pumping rod are possible: one where the rig is mounted on the ground. In this case the pump cable will be carried over a head sheave mounted in the derrick 50 to 75 feet above the well and the length of stroke will be limited by the height of the head sheave above the well. With this arrangement a hole of suitable size will be drilled for the counter-weight to travel in, or a second sheave mounted in the derrick to carry the counter-weight cable in which case the counter weight will have free movement.

The second arrangement will be where the pump rig is mounted in the derrick 50 to 75 feet above the ground and over the well. The height of mounting will limit the length of stroke. Counter-weight will have free movement.

Results secured:

(1) The much sought long stroke pumping rig that will work.

(2) By using a 50 to 75 foot pumping stroke stretching of sucker rods occurs only once every 50 to 75 feet. Whereas the present crank and pitman, and walking beam stretches them every two to five feet. Loss of energy used in stretching rods is thereby reduced about 90%. Also breakage of rods due to frequent stretching will be reduced about 90%. (With present walking beam pump rigs a new set of rods lasts about 5 months before breaking. Thereafter they break about every month. Pulling the rods and repairing them costs about $40.)

(3) Better operation of working barrel can be secured with a long stroke pump as the piston speed is more uniform. A longer and heavier plunger (or piston) can be used with less loss of working barrel capacity than would be the case with a short working barrel. Example: A plunger four feet long will use 50% of the capacity of an eight foot working barrel, and only 8% of a fifty foot working barrel.

The key to the operation of this method is the arrangements of standard parts so as to make possible (or practical) the use of a reversing prime mover under continuous frequent reversing service. With an electric motor operating in frequent reversing service with normal starting torque required the amount of current required during the starting (or acceleration) period is from 3 to 4 times normal running current, and the resultant heating during starting, being proportional to the square of the current, is from 9 to 16 times normal heating for the period. With energy being stored by the prime mover while in normal operation to be available to start the next stroke, the starting duty is eliminated.

Operation of an oil well pump pumping oil from a 3700 foot oil well:—
  1¾" working barrel—⅝" sucker rods
  Weight of fluid column—3000 pounds
  Weight of sucker rods—4800 pounds With pump at bottom of down stroke its load of 7800 pounds working through one foot radius will be started up by counter weight of 6300 pounds working through a radius of 1.4 feet. At the end of the up-stroke rods weighing 4800 pounds working through 1.4 foot radius will start the counter-weight of 6300 working through a 1 foot radius.

2½" working barrel—¾" sucker rods
  Weight of fluid column—6000 pounds
  Weight of sucker rods—6000 pounds With pump at bottom of down-stroke its load of 12000 pounds working through 1 foot radius will be started up by counter-weight of 9000 pounds working through 1.6 foot radius. At the end of the up-stroke the rods weighing 6000 pounds working through 1.6 foot radius will start the counter-weight of 9000 pounds working through 1 foot radius.

What I claim is:—

1. A method of applying power for securing a long pumping stroke for reciprocating pumps employed for lifting fluid from beneath the earth's surface consisting in changing a counter-weight effect upon a rotatable conoidal shaped winding and unwinding element for a pump rod elevating and lowering cable and with said element driven from a prime mover thereby providing an unbalancing action during the completion of a pumping stroke and providing for such action at the end of each pumping stroke to assist in starting a succeeding stroke, and reversing the driving direction of the prime mover at the end of each pumping stroke to change the direction of movement of said element.

2. A method of applying power for securing a long pumping stroke for reciprocating pumps employed for lifting fluid from beneath the earth's surface consisting in changing a counter-weight effect upon a rotatable conoidal shaped winding and unwinding element for a pump rod elevating and lowering cable and with said element driven from a prime mover thereby providing an unbalancing action during the completion of a pumping stroke and providing for such action at the end of each pumping stroke to assist in starting a succeeding stroke, and automatically reversing the driving direction of the prime mover at the end of each pumping stroke to change the direction of movement of said element.

3. A method of applying power for securing a long pumping stroke for reciprocating pumps employed for lifting fluid from beneath the earth's surface consisting in changing the radius of a counter-weight elevating and lowering means and the radius of a winding and unwinding element for a pump rod elevating and lowering cable and with said element driven from a prime mover thereby providing an unbalancing action during the completion of a pumping stroke and providing for such action at the end of each pumping stroke to assist in starting a succeeding stroke, and reversing the driving direction of the prime mover at the end of each pumping stroke to change the direction of movement of said element.

4. A method of counter-acting the condition that exists at the end of each pumping stroke to assist in starting a succeeding stroke, consisting in unbalancing a counter-weight against a pump rod and fluid column, and in turn, the pump rod against the counter-weight by changing the effective radius of a reversible means for and on which and from which flexible members wind and unwind respectively and alternately for respectively elevating and lowering the pump rod and lowering and elevating the counter-weight.

5. In an apparatus for securing a long pumping stroke for reciprocatory pump rods employed for lifting fluid from beneath the earth's surface and whereby the starting of each stroke of the rod will be had without effort from a prime mover, an electric motor constituting a prime mover, means for automatically reversing the direction of the drive from said motor at the ends of the up and down strokes of the pump rod, a reversible speed reducing mechanism driven from said motor, a reversible shaft driven from said mechanism, a pulley arranged above said shaft, a weight arranged below said shaft, a pair of suspension members, one connected at its outer end to said weight, the other of said members traveling over said pulley and adapted to have its outer end connected to the pump rod, and a pair of spaced winding elements bodily moving with said shaft for said suspension members, said members coacting with said elements to provide when the pump rod is at the end of its downstroke for a portion of the stretch of the rod suspension member working through a short radius on its winding element and for a portion of the stretch of the weight suspension member working through a long radius on its winding element whereby the upstroke of the pump rod will be had without effort from the motor and to provide when the pump rod is at the end of its upstroke for a portion of the stretch of the rod suspension member working through a long radius on its winding element and a portion of the stretch of the weight suspension member working through a short radius on its winding element whereby the weight of the rod will start the downstroke of the latter without effort from said motor.

6. In an apparatus for securing a long pumping stroke for reciprocatory pump rods employed for lifting fluid from beneath the earth's surface and whereby the starting of each stroke of the rod will be had without effort from a prime mover, an electric motor constituting a prime mover, means for automatically reversing the direction of the drive from said motor at the ends of the up and downstrokes of the pump rod, a reversible speed reducing mechanism driven from said motor, a reversible shaft driven from said mechanism, a pulley arranged above said shaft, a weight arranged below said shaft, a suspension means traveling over said pulley having a stretch thereof attached to said weight and a stretch thereof adapted to be connected to the pump rod, an oppositely tapered winding drum for the stretches of said means, said stretches being disposed relatively to said drum to provide for a portion of the pump rod stretch working through a short radius on the drum and a portion of the weight stretch working through a long radius on the drum whereby the start of the upstroke of the pump rod will be had without effort from the motor and to provide when the pump rod is at the end of its upstroke for a portion of the pump rod stretch working through a long radius on the drum and a portion of the weight stretch working through a short radius on the drum whereby the weight of the pump rod will act to start the downstroke of the pump rod without effort from the motor.

7. In an apparatus for securing a long pumping stroke for reciprocatory pump rods employed for lifting fluid from beneath the earth's surface and whereby the starting of each stroke of the rod will be had without effort from a prime mover, an electric motor constituting a prime mover, means for automatically reversing the direction of the drive from said motor at the ends of the up and downstrokes of the pump rod, a reversible speed reducing mechanism driven from said motor, a reversible shaft driven from said mechanism, a pulley arranged above said shaft, a weight arranged below said shaft, a revoluble reel bodily moving with said shaft, a revoluble drum bodily moving with said shaft, a suspension member attached at its outer end to said weight and having a stretch thereof winding off and on said reel, and a suspension member traveling over said pulley, having a stretch thereof winding off and on said drum and adapted to have its outer end connected to the pump rod.

8. In an apparatus for applying power for the operation of reciprocatory pumps, a prime mover, means for automatically reversing the direction of the drive of the prime mover at the ends of the up and downstrokes of a pump rod, a reversible speed reducing mechanism driven from said prime mover, a reversible shaft driven from said mechanism, a flexible elevating and lowering means including a weighted stretch and pump rod stretch, and winding means bodily moving with said shaft for operating said elevating and lowering means and including parts to provide when the pump rod is at the end of its downstroke for a portion of said pump rod stretch working through a short radius on said winding means and for a portion of the weighted stretch working through a long radius on said winding means whereby the start of the upstroke of the pump rod will be had without effort from the prime mover and to provide when the pump rod is at the end of its upstroke for a portion of the pump rod stretch working through a long radius on said winding means and a portion of the weighted stretch working through a short radius on said winding means whereby the weight of the rod will start the downstroke of the latter without effort from the prime mover.

9. A method of applying power for operation of reciprocatory pumps used for lifting fluid from beneath the earth's surface consisting in providing simultaneously during the downstroke of the pump rod a gradually decreasing effective radius and a gradually increasing effective radius of a winding and unwinding means for a counterbalanced pump rod elevating and lowering means and with the gradually decreasing effective radius disposed with respect to the pump rod and the gradually increasing effective radius disposed with respect to the counterbalance, and providing simultaneously during the upstroke of the pump rod a gradually increasing effective radius and a gradually decreasing effective radius of said winding means for said elevating and lowering means and with the gradually increasing effective radius during the upstroke disposed with respect to the pump rod and the gradually decreasing effective radius during the upstroke disposed with respect to the counterbalance.

J GAYLE GILLESPIE.